United States Patent [19]

McFarland

[11] Patent Number: 4,457,182
[45] Date of Patent: Jul. 3, 1984

[54] THROTTLE CONTROLLER FOR ENGINES IN DYNAMOMETER TESTING

[76] Inventor: Robert A. McFarland, 640 Sunvale, Ventura, Calif. 93003

[21] Appl. No.: 378,818

[22] Filed: May 17, 1982

[51] Int. Cl.³ .................. G01L 3/22; G01M 15/00
[52] U.S. Cl. .................................................. 73/862.18
[58] Field of Search .......... 73/862.13, 862.16, 862.18, 73/116

[56] References Cited

U.S. PATENT DOCUMENTS

| 3,050,994 | 8/1962 | Heigl | 73/117 |
| 3,333,463 | 8/1967 | Hollinghurst | 73/117 |
| 3,364,736 | 1/1968 | Bathurst et al. | 73/862.16 |
| 3,926,043 | 12/1975 | Marshall et al. | 73/117 |
| 3,938,377 | 2/1976 | Converse et al. | 73/117 |
| 4,186,593 | 2/1980 | Watanabe | 73/117 |
| 4,263,561 | 4/1981 | Weber | 330/69 X |
| 4,382,388 | 5/1983 | Ono | 73/862.18 |

Primary Examiner—Jerry W. Myracle
Attorney, Agent, or Firm—Browdy and Neimark

[57] ABSTRACT

A throttle controller comprising circuit means for accomplishing numerous improvements including means to convert the reactive load cell torque value into a true torque value instantaneously using an extremely simple passive circuit; together with means to use this value together with either load or power feedback values to generate a true shaft load signal. The circuit also includes improved means to permit the throttle controller to provide a single pulse usable for the dual functions of driving either a servo or a solenoid type actuator, in addition to other types of actuators for the throttle of the engine being tested.

10 Claims, 6 Drawing Figures $T_{INERTIA} = I_{ROTOR} \times \alpha_{ROTOR}$ $T_{SHAFT} = T_{REACTIVE} + T_{INERTIA}$

THROTTLE CONTROLLER FOR ENGINES IN DYNAMOMETER TESTING

FIELD OF THE INVENTION

This invention relates to electronic apparatus for controlling the operation of the throttle of the engine being tested using a dynamometer.

Most generally, a dynamometer is a machine for measuring energy. More specifically, in the environment of the present invention, a dynamometer is, in effect, a relatively large heavy duty electric machine which can be operated as either a motor or as a generator. This machine is directly coupled to an engine being tested, and can be used in either engine mode or motor mode. In motor mode the dynamometer drives the engine, and in engine mode the engine drives the dynamometer. In both cases, numerous parameters of the performance of the engine can be tested, such as horsepower, braking ability, exhaust emissions, and numerous other parameters around the engine, as is well known to those skilled in these arts. Dynamometer testing is most often applied to larger engines used for industrial purposes such as oil rigs, heavy duty trucks, and the like, and to high performance engines such a racing car engines, as well as in government testing, such as dynamometer sequences which produce the EPA ratings of new automobiles. Thus, the use of dynamometers is quite wide spread, and there is a significant need for controllers for the throttles of the engine being tested by such dynamometers.

In engine dynamometer testing, the dynamometer normally loads the engine being tested. Control of the throttle of the engine is one of the main parameters used in running the engine tests overall. The present invention provides an improved throttle controller for use in this environment having numerous inherent advantages and solving many problems in the prior art.

PROBLEMS IN THE PRIOR ART AND ADVANTAGES OF THE INVENTION

Prior art throttle controllers have numerous problems which are overcome by the present invention. These problems include that the throttle controller often must be custom made or matched to the particular engine which it is being used to control.

The invention throttle includes means to permit it to sense any one of a relatively large number of engine parameters to be monitored, which data are used, hence dependent on the control mode selected, by the invention throttle controller in controlling the engine.

The invention throttle controller has the ability of working with either load or RPM, or even with other parameters around the engine using the external transducer feeback, mentioned in the paragraph immediately above. This is a substantial advantage for the invention as compared to prior art throttle controllers.

The throttle controller of the invention can cooperate with many dynamometer controllers, that is the controller on the dynamometer itself. By suitable connections and by sensing certain data from the dynamometer controller, the manner of operation of the invention throttle controller is improved, that is, by permitting the throttle controller to operate on the other one of the engine speed and the load on the dynamometer, which ever one is not being operated upon by the dynamometer controller itself.

Further, as mentioned in the immediately preceding paragraph, this mode selection can be done automatically, depending upon the mode of operation of the dynamometer controller.

Further, the invention can also provide the same sort of controls as is conventionally provided, namely, can operate the engine based on positions, i.e., throttle halfway depressed, ¾'s depressed, 30°, or the like. This sort of physical positioning of the accelerator is important for certain types of carburetor testing and other tests well known to those skilled in these arts.

Another improvement of the invention pertains to built in interfaces to interconnect the controller with other control devices, such as external RPM, load, and dynamometer controllers.

Another advantage of the invention is that it provides a single modular device completely preassembled, in a highly reliable manner, and ready for use by the dynamometer user.

Another important advantage of the invention resides in its improved noise immunity. The present invention works in an extremely "noisy" environment. The "noise" referred to is both sonic noise as well as electrical noise, both of which are caused by the relatively large dynamometer itself, the sometimes even larger and heavier internal combustion engines, both diesel and gasoline, on which such dynamometers are used, as well as ignitions, heavy relays which open and close thereby creating large high voltage sparks, general high voltage conditions in the area, and the like, all of which contribute to both the physical and electrical noise within which the invention must operate. Insulating the critical parts of the control circuitry from this noise is very important in that the output results are only as good as the input raw data on which those results are based. The invention provides important advantages in the area of protecting the circuitry from this noise and thereby enhancing the output results, i.e., the accuracy and precision, of the present invention.

Other important advantages of the invention reside in the manner of construction, namely, the provision of all normal calibration adjustments from the front of the instrument by removal of the name plate, and very high reliability of the circuitry by the virtual elimination of manual wiring. Almost all of the circuitry is provided on a single printed circuit board.

Every dynamometer includes means to sense the engine torque. One very popular type of torque sensor provided by many dynamometer manufactures is known as the load cell type which is mounted on an external arm of the casing of the dynamometer. Load cells have many advantages and are thus popularly used. However, load cells have one important disadvantage which is overcome by the present invention controller. Load cells are only indirectly responsive or reactive to the shaft torque as transmitted to the cell via the armature and the field of the dynamometer. This indirect reaction becomes especially problemsome during accelerations and deaccelerations of the engine since the torque sensed at the load cell is not in fact equal to the engine torque because of the delay time necessary to overcome the inertia of the dynamometer.

The present invention provides means in the controller to correct for this inherent disadvantage of load cell type torque sensors so that they become, in effect, instantly responsive to the shaft torque between the engine and dynamometer. Other types of torque sensors, known as shaft torque sensors are directly responsive, but have other disadvantages as compared to the load cell type of sensor. Thus, this portion of the invention provides for the correction of the one disadvantage of the load cell type sensor so as to thereby make it equivalent, and in fact, overall better, than the shaft torque type sensor. This is a significant step forward in the art made by the present invention.

More in detail, the primary difference between load cell and shaft types of torque sensors resides in their relative costs. A load cell types sensor can cost as little as one tenth the cost of a shaft sensor. Thus, the invention provides the same advantage as the shaft sensor for the enormously less expensive load cell sensor.

Further, this corrected instantaneous true value for shaft torque derived by this portion of the invention circuitry is used in a unique manner in the invention circuitry to compensate for torque during testing. This is an important advantage of the invention and these advantages are enhanced and multiplied by the cooperative effect between the cost saving and the torque compensation.

The invention includes a single display operated by a selector switch to thereby display numbers corresponding to any one of a plurality of selected parameters around the system being controlled.

BRIEF DESCRIPTION OF THE DRAWINGS

The above and other advantages of the invention will be pointed out or will become evident in the following detailed description and claims, and in the accompanying drawing also forming a part of the disclosure, in which:

FIGS. 5 and 6 are detailed electrical schematic drawings of various parts of the controller shown in FIG. 1.

DETAILED DESCRIPTION OF THE DRAWINGS

Figure 1:
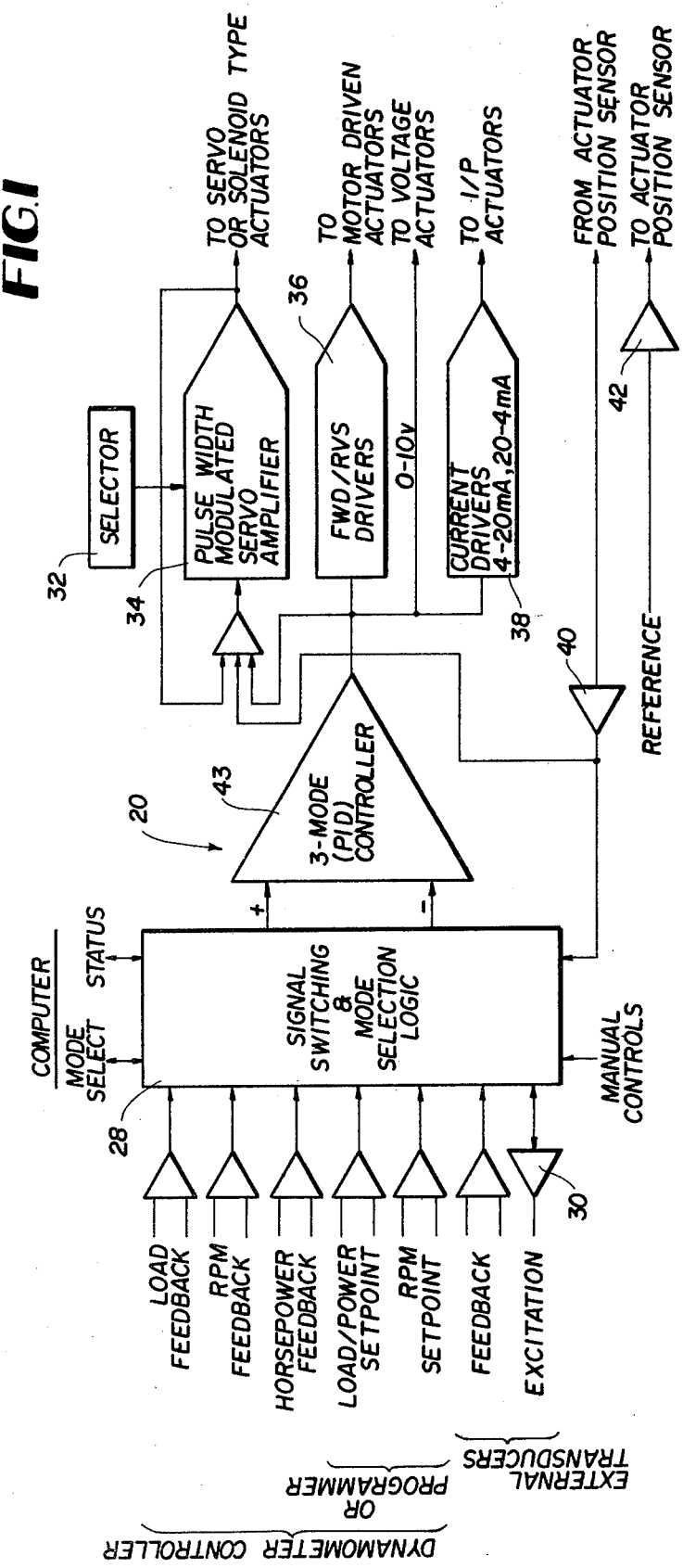
FIG. 1 is an overall block diagram of a throttle controller embodying the invention.
Figure 3:
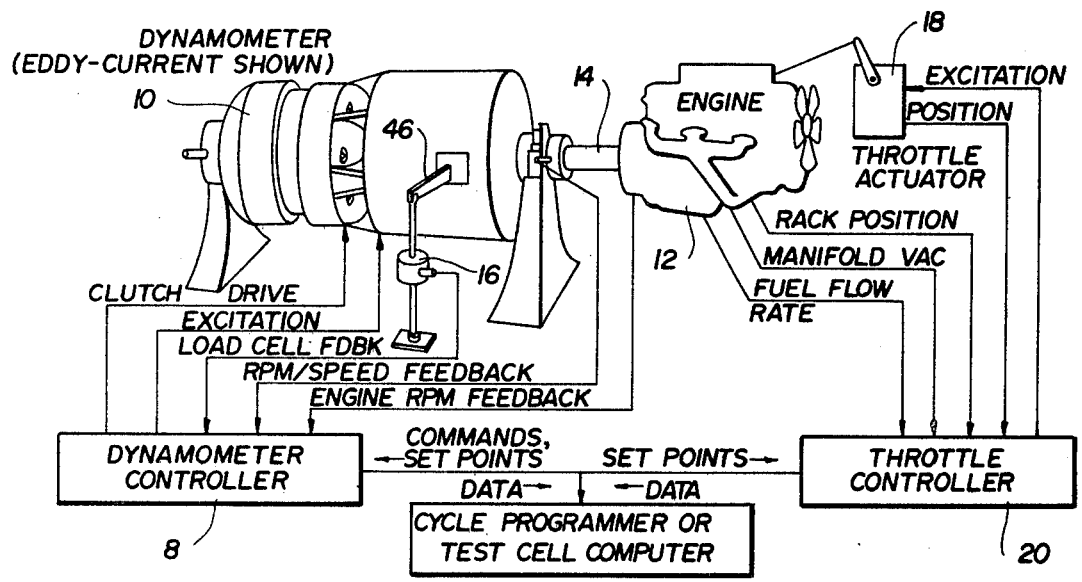
FIG. 3 is a partially perspective view and a partially block diagram showing the environment of an engine and a dynamometer with which the invention controller is used.

Referring now to FIGS. 1 and 3, reference numeral 8 indicates a dynamometer controller, and the environment of the invention includes a dynamometer 10 coupled to an engine 12 by a shaft 14, the dynamometer 10 being of the eddy current type by way of example. A load cell 16 is provided for measuring the torque of the dynamometer. A throttle actuator 18 physically operates the throttle of the engine 12 under the commands of the throttle controller 20. The numerous legends on FIG. 3 make it self-explanatory in setting forth its example of one installation in which the invention can be used.

Referring now to FIG. 1, the presentation of controller 20 therein is arranged so that the inputs, that is the setting of the controls by the operator as well as certain feedbacks, set points, and the like are arranged along the left side. Along the right side are the outputs from the controller to different types of actuators, typified by block 18 in FIG. 3, with which the invention controller can cooperate to control the throttle of the engine 12.

Figure 2:
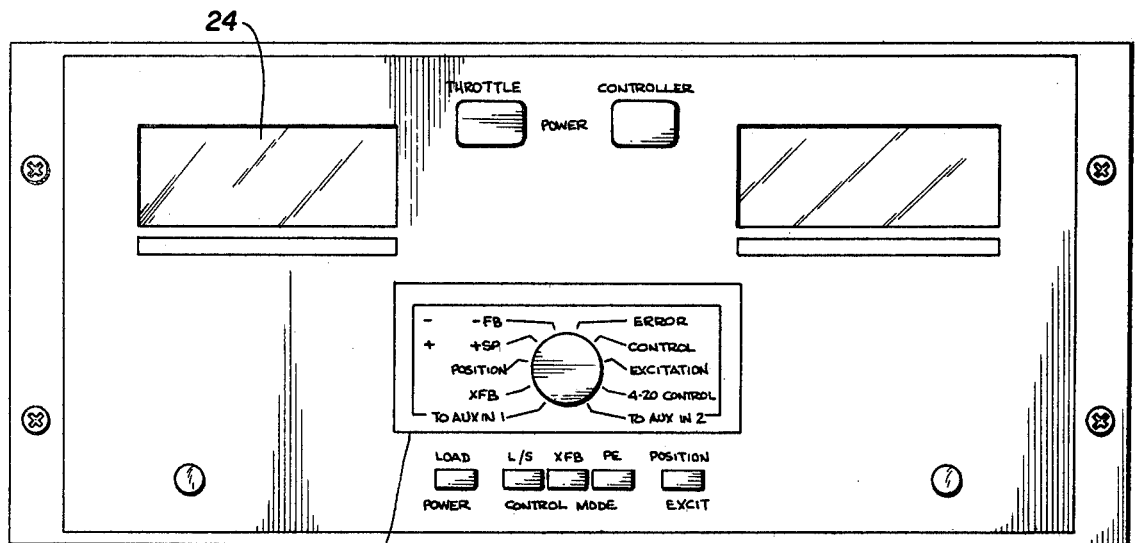
FIG. 2 is a front elevational view of a control panel of a controller embodying the invention.

The block 22 in FIG. 2, is a part of the invention which permits the left hand display 24 in FIG. 2 to selectively display numerous other values sensed around the system, i.e. excitation, control, position and the like, all of which are indicated by the legends on the dial in FIG. 2. The other push buttons shown in FIG. 2 are marked with self-explanatory legends.

Block 28, marked Signal Switching and Mode Selection Logic routes the desired inputs on the left side of block 28 to the outputs on the right side of block 28 according to states of the mode select or manual controls inputs. The block 30 in the lower left hand corner of FIG. 1 represents any one or more of a very large number of engine parameters which can be monitored using the invention throttle controller. These parameters include fuel flow rate, manifold vacuum pressure, oxygen content in the exhaust gases, and many other parameters around the engine being tested, as is well known to those skilled in the art.

This block 30 represents the provision by the invention controller of the excitation needed by whatever particular transducer is being used to provide the data corresponding to the particular one or more parameters being used to provide the feedback from this transducer concerning that parameter. The other blocks along the left hand side cooperating with the central block 28 indicate the interaction of the invention throttle controller with a dynamometer controller, such as the block 8 in FIG. 3, or control of the invention throttle controller in accordance with some preprogrammed means to control the engine, as indicated by the legends on the left hand side of FIG. 1. These other triangular blocks correspond in part to the push buttons along the bottom along the front of the controller, as indicated by the legends in FIG. 2. These push buttons can select certain predetermined methods of operating the engine, such as constant speed control, constant power control, constant load control, constant position control, and the like.

The invention can be used with any sort of throttle actuator represented by the block 18 in FIG. 3, as mentioned above. Different sorts of actuators require different sorts of control signals, and this is indicated by the array of blocks 32 through 42 marked with suitable legends along the right hand side of FIG. 1. These blocks include suitable amplifiers, selector means, feedbacks, and the like, all as is required by the particular actuator 18 being controlled by the invention controller 20. The ability to work with and to control any sort of actuator in popular use is an important advantage of the invention. Of course, only one of the various blocks 32 through 42 will be used in any particular environment, depending upon the nature of the particular actuator in the test set-up.

Dynamometer engine testing is done most frequently at a particular "operating point". The "operating point" is defined by some particular RPM and some particular load; for example, 6000 RPM and 275 foot-pounds of torque. These two parameters are the only controllables in the system as to the invention throttle controller, namely the input to the throttle of the engine, and the load on the dynamometer. The operating point can be changed by changing either the engine speed or by changing the load at the dynamometer, or by changing both engine speed and dynamometer load. The invention throttle controller has the ability to work with just load, just RPM, combinations of the two, or, further, in accordance with other parameters picked up around the engine using the external transducer 30 in FIG. 1 and described above. The block 43 in FIG. 1 is an analog computer which computes the special control or algorythm required to implement these different modes of which the invention is capable.

Further, the invention permits closed loop control based on either of the two important parameters, throttle position or load. In that regard, referring to FIG. 3 and the left side of FIG. 1, the dynamometer controller 8 and the invention throttle controller 20 are interconnected such that the throttle has data provided to it concerning the mode under which the dynamometer is being controlled, i.e., whether the dynamometer is being controlled in accordance with RPM or in accordance with load. With that data, the invention throttle controller 20 operates with the other of these two parameters in a closed loop feedback method. The mode selection can be done automatically depending upon the selected method of operation, as described above, and with regard to the push buttons along the bottom of FIG. 2, to permit the invention throttle controller to operate upon the nonselected one of the two main parameters, i.e., the one that the dynamometer controller 8 is not using in controlling the dynamometer.

Thus, the invention throttle controller provides considerably more versatility than many throttle controllers. In throttle controllers, typically, there are three possible variables, namely LOAD, RPM, and current or water depending upon whether the dynamometer is of the eddy current of water brake type. In the invention throttle controller there are many LOAD, namely mode, RPM, and the host of external feedbacks typified by the block 30 in the lower left of FIG. 1.

The horsepower feedback, the third one down on the left side feeding into block 28, can be picked up off of a simple calculation block, or can be provided by the dynamometer if it is of the type which includes means to make the necessary calculation to provide this data.

Further, the invention throttle controller can work based on throttle positions, i.e., halfway depressed, ¾'s depressed, some predetermined number of degrees down from the starting position, or other variations of the physical position of the accelerator of the engine. This kind of physical positioning is important, as is well known to those in the engine testing arts, for certain types of carburetor testing and for certain other types of tests.

Each of the input triangle blocks on the left side of FIG. 1 has two imput lines because they each operate in a differential manner to thereby enhance noise rejection. As set forth in the introductory portion above, the noise of the environment in which the invention throttle controller and in which dynamometer testing in general is done, both sonic noise and electrical noise, is great, and noise rejection is very important. This aspect of the invention aids in the overall noise rejection and noise immunity of the invention throttle controller.

Figure 4:
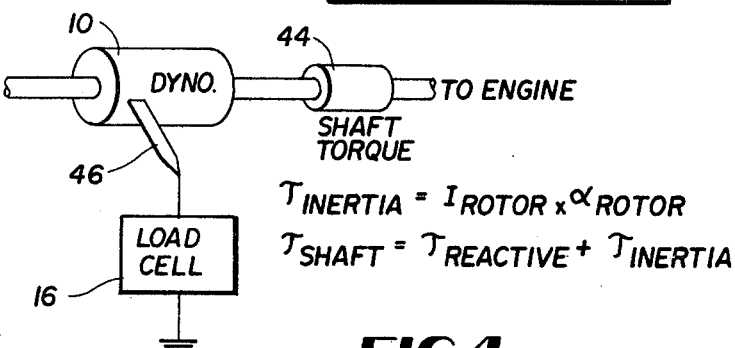
FIG. 4 is a schematic showing of a load cell torque sensor and the equation illustrating an important advantage of the invention.

Referring now to FIG. 4, there is shown a hypothetical situation wherein a dynomometer is functioning with the two popular types of torque sensors, a load cell such as the load cell 16 of FIG. 3, and a shaft torque sensor indicated at 44. This is of course quite hypothetical, in any real life environment a particular dynamometer will only have one or the other of the load cell or the shaft types of torque sensors. As set forth in the introductory portions above, the load cell includes an external arm 46 on the casing of the dynamometer proper 10. This type of torque sensor has many advantages and is very popularly used, but it has an important disadvantage in that it is only indirectly reactive to the shaft torque that is transmitted to it via the armature and the field of the dynamometer. This creates numerous problems, especially serious during accelerations and decelerations of the dynamometer because the torque sensed at the load cell 16 is not truly equal to the engine torque because of the time necessary to overcome the inertia of the dynamometer rotor. The shaft torque-type sensor 76 overcomes this problem because, since it is on the shaft itself, it is directly responsive. However, shaft torque types have other disadvantages making them less popularly used than the load cell type.

Most importantly, the relative disadvantage between these two types of torque sensors is one of cost. The shaft torque type of sensor can cost as much as ten times the cost of a load cell type sensor. Thus, the invention circuitry, by its ability to convert the delayed reactive torque signal into a true torque signal instantaneously, overcomes the disadvantage, and, in effect, provides the user with the highly advantageous shaft torque sensor at the much reduced price and cost of the load cell sensor.

Further, conversions of installations already having load cell type sensors are possible using the invention throttle controller. In addition, this part of the circuitry, described in the paragraph immediately below, is entirely passive, and provides its advantage with no moving parts, using only a relatively simple array of static electronic parts.

Part of the circuitry in FIG. 5 solves this problem and in effect converts the reactive and delayed torque signal which is produced by the load cell 16 into a true torque signal, and does so instantaneously at the speed of the electronics.

The invention accomplishes this and achieves this very substantial step forward of making a load cell type sensor truly instantaneously reactive to shaft torque, rather than indirectly responsive, by using the equations set forth in FIG. 4 and corresponding circuitry to implement these equations. The relationship is that the true torque of the rotor is equal to the reactive torque, plus the moment of inertia of the rotor times its acceleration. The equations will accomplish the result whether the engine-dynamometer set is accelerating or decelerating from the measured torque at the load cell to determine the true torque instantaneously.

The circuitry of FIG. 5, accomplishes this in a completely passive manner, that is, no active electronics which is an extremely great step forward for the invention. In this manner, a highly reliable and simple circuit can be provided to achieve the results.

Referring to FIG. 5, the circuitry comprises a very simple array of a potentiometer R45, a capacitor C56, and a protective resistor R133 which serves a current limiting function only. The potentiometer R45 does double service in the circuit because its initial setting also compensates for the value of the moment of inertia of the rotor of the dynamometer, and is a one time setting for any particular machine with which the invention controller is used. In operation in carrying out the equations however, there is a quite complex trading off and feeding back and forth of the various signals and values between the two major components R45 and capacitor C56 to perform these two functions. In any event, the net result is that if one of these signals is held constant, as by the reactive torque signal feeding into R45 or the RPM signal (see FIG. 1) feeding onto capacitor 56, then as a result the output will always be the true torque signal in accordance with the equations set forth in FIG. 4 and described above. Thus, the two functions go on simultaneously, however, if one value changes and the other is held constant, still the output result is correct, i.e., a signal instantaneously representative of the true torque.

The RPM signal can be derived from the preprogramming, or picked up from the dynamometer with which the invention throttle controller is being used. This part of the invention depends upon the fact that acceleration is the derivative of speed, and thus the RPM signal fed into the capacitor C56 permits the creation of a signal proportional to acceleration, which value is necessary for carrying out the equations of FIG. 4.

The remainder of FIG. 5 comprises a block 48, a differential amplifier at unity gain, which inputs either the load feedback signal or the power feedback signal dependent upon the position of a selector switch 52 into a summing device, indicated by the logic block 50, which also receives the true torque value from the array of parts R45, C56 and R133, described below. The output of the summing block 50 is the true shaft load, which is the parameter needed in the dynamometer testing of the engine 12. The provision of the differential amplifier 48 insures good signal/noise immunity. This amplifier eliminates any ground loop problems and common mode noise signals which could possibly be picked up by the equipment, particularly the cables interconnecting the dynamometer controller 8 and the invention throttle controller 20.

The provision of the signal at the output of the block 50 indicative of true shaft load, based on either load feedback or power feedback in accordance with the position of the switch 52, is of enormous importance in a throttle controller for dynamometer engine testing. The problem to which this is addressed is, for example, a situation wherein the operator is trying to control speed with the dynamometer and load with the throttle. What can often occur is that if the speed should perchance be set too high, then the dynamometer load increases, which in turn causes the engine speed to reduce, which causes the throttle controller to increase the load. This causes an oscillation or "flipping" back and forth, in short, an unstable condition, and an unstable condition which tends to never stabilize itself. The portion of the invention in FIG. 5 solves this problem by decoupling the normal control loops, and using the calculated true shaft torque to directly control the engine. This permits the engine speed to do as it will during the transition. The net result is that sharp step changes can be done with high precision, much faster, and with quick settling at the new speed, using the invention throttle controller.

Referring now to FIG. 6, the block 34 of FIG. 1 and its surrounding circuitry is shown in more detail. This part of the invention circuitry provides advantages and a step forward in the art by providing an extremely stable signal, and one which can be used by either the servo type or the solenoid type of actuator, as indicated in the upper right hand corner of FIG. 1 and as described above.

This part of the circuit, overall, is a proportional plus derivative control amplifier. The feedback is a combination of the position feedback from the amplifier 40 of FIG. 1, and the control signal from the block 44. Thus, as indicated in FIG. 6, the first summation block 56 receives the actuator current feedback and the position feedback. The derivative of this, as indicated by the block 60, is fed into the second summation block 58, which is also fed a signal proportional to the position feedback from the block 40. This combined signal then comprises the second input to the differential amplifier 54, the other input to which is the control signal from block 44. This finally feeds into the power amplifier, which becomes a pulse width modulator power amplifier in the invention circuitry using known techniques and electronics, which is then output to control the servo or solenoid type of actuator, as needed.

Thus, a dual functioning is provided, i.e., the one output signal from the amplifier 34 can be used to control either a servo type actuator or a solenoid type actuator represented by the block 18 in FIG. 3, to control the throttle of the engine 12.

The signal from the selector block 32 shown in FIG. 1 and indicated in FIG. 6, causes the output of the amplifier 34 to be either bi-polar, or uni-polar. Bi-polar in this context means swinging between the plus and minus values, while uni-polar means swinging from zero to some plus or some minus value only. This is required by the different servos and solenoids which can be used with and controlled by the invention circuitry.

Thus, overall, this part of the invention circuitry shown in FIG. 6 provides an extremely stable signal, one which is dual function in that it can drive one of two popular types of throttle controllers, and one which is uniquely derived as set forth above.

While, the invention has been described in detail above, it is to be understood that this detailed description is by way of example only, and the protection granted is to be limited only within the spirit of the invention and the scope of the following claims.

I claim:

1. In a throttle controller for an engine being tested on a dynamometer, the improvement comprising a circuit comprising means to control the throttle of said engine in accordance with a mode in accordance with one of dynamometer load or engine speed in a closed loop fashion, said dynamometer including a controller, said dynamometer controller operating in one of said dynamometer load and engine speed modes to control said dynamometer, and said circuit means controlling said engine's throttle using the other of said dynamometer load or engine speed mode not being used by said dynamometer controller.

2. In the controller of claim 1, wherein said circuit further comprises means to sense at least one of a plurality of other parameters of the engine being tested, and wherein said circuit controls said engine throttle in accordance with one of said dynamometer load mode, said engine speed mode, or a third mode dependent upon the values of said one of said plurality of engine parameters being sensed.

3. In the controller of claim 2, wherein said engine parameters being sensed include rate of fuel flow, manifold vacuum pressure, engine temperature, and oxygen content of the engine exhaust gases.

4. In a throttle controller for an engine being tested on a dynamometer, the improvement comprising a circuit comprising means to control the throttle of said engine, said circuit comprising a plurality of transducers associated with said engine, noise suppression means between each said transducer and other portions of said circuit, and said noise suppression means comprising means to input the signal from said transducer to other parts of said circuit means in a differential manner.

5. In the controller of claim 4, wherein each transducer generates a signal proportional to the value of a selected engine operating parameter, said engine parameters to be monitored including at least fuel flow rate, manifold vacuum pressure, engine temperature, and oxygen content in the exhaust gases of said engine.

6. In a throttle controller for an engine being tested on a dynamometer, the improvement comprising a circuit comprising means to control the throttle of said engine, said dynamometer having a load cell type torque sensor, said controller comprising means to instantaneously convert the reactive torque signals from said load cell type torque sensor into a signal representative of true shaft torque, and said circuit means comprising means to calculate the equation: true torque equals reactive torque, plus moment of inertia of said dynamometer rotor times the acceleration of said dynamometer rotor.

7. The controller of claim 6, said circuit means for calculating true torque comprising a capacitor and a potentiometer, said capacitor being of a predetermined value, means to feed signals proportional to the RPM of said dynamometer to one side of said capacitor, means to connect the other side of said capacitor to the movable terminal of said potentiometer, and means to feed signals from said load cell representative of the reactive torque sensed at said load cell to one side of the coil portion of said potentiometer, whereby the signal at the other end of the coil portion of said potentiometer is representative of the true torque of said dynomometer rotor instantaneously in real time, and whereby a value proportional to the moment of inertia of said dynamometer rotor can be preset as a calibration on said potentiometer.

8. The controller of claim 6, said circuit means further comprising means to convert the signal representative of true shaft torque into a signal representative of true shaft load dependent upon a feedback of either load or power, said last mentioned circuit means comprising a summation means, one of the inputs to said summation means comprising said signal representative of true shaft torque, the other of the inputs to said summation means comprising one of a load feedback signal or a power feedback signal, and means for using the thus calculated signal representative of true shaft load to control the engine being tested.

9. In a throttle controller for an engine being tested on a dynamometer, the improvement comprising a circuit comprising means to control the throttle of said engine, means to output a single control signal from said circuit means to either a servo type or a solenoid actuator for the throttle of said engine, said last mentioned output means comprising a pulse width modulated power amplifier, and means to determine the output of said amplifier based on a feedback based on throttle position or a feedback based on a control mode signal generated in other parts of said throttle control circuit.

10. The controller of claim 9, said last mentioned output means further comprising a first summation means, means to input the actuator current output of said modulated power amplifier as a feedback input to said first summation means, means to input said feedback based on throttle position as the second input to said first summation means, means to supply the output signal of said first summation means to means to derive the derivative of said output of said first summation means, means to supply the output of said derivative means as the first input to a second summation means, means to input said position feedback signal as the second input to said second summation means, means to supply the output signal of said second summation means to a differential amplifier, means to input said control mode feedback signal as the second input to said differential amplifier, and means to supply the output of said differential amplifier as the input to said modulated power amplifier means.

* * * * *